(12) United States Patent
Loukusa et al.

(10) Patent No.: US 7,867,019 B1
(45) Date of Patent: Jan. 11, 2011

(54) THERMAL IMAGING DEVICE WITH A BATTERY PACK WITH A SHOCK ABSORBER

(75) Inventors: Michael E. Loukusa, Buffalo, MN (US); Justin M. Sheard, Rogers, MN (US); Jeffrey Elrod, Seattle, WA (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 12/504,962

(22) Filed: Jul. 17, 2009

(51) Int. Cl.
*H01R 3/00* (2006.01)
*H01R 4/38* (2006.01)

(52) U.S. Cl. ...................... 439/500; 439/382

(58) Field of Classification Search .............. 439/500, 439/382, 559, 66, 271
See application file for complete search history.

(56) References Cited

U.S. PATENT DOCUMENTS

| | | | |
|---|---|---|---|
| 4,005,605 A * | 2/1977 | Michael ................ | 374/129 |
| 4,515,872 A * | 5/1985 | Okano .................. | 429/65 |
| 4,634,294 A * | 1/1987 | Christol et al. ........ | 374/170 |
| 6,764,332 B2 * | 7/2004 | Sato .................... | 439/382 |
| 7,157,705 B2 * | 1/2007 | Hamrelius et al. ..... | 250/330 |
| 7,223,494 B2 * | 5/2007 | Takeshita et al. ...... | 429/123 |
| 7,556,526 B2 * | 7/2009 | Ebine et al. ........... | 439/500 |
| 7,638,234 B2 * | 12/2009 | Naito et al. ........... | 429/100 |
| 2003/0143888 A1 * | 7/2003 | Sato .................... | 439/382 |

OTHER PUBLICATIONS

Brochure, Fluke IR InSight(R) Thermal Imagers, locate building problems quickly and easily, © 2006 Fluke Corporation. All rights reserved. Printed in U.S.A. Jun. 2006 2694809 D-EN-N Rev A.
Website: Panasonic Battery Packs, http://panasonic.premiumstore.com/cat/1820/Panasonic-Power-Tool-Battery-Packs.html, viewed on Jul. 16, 2009.
Infrared Solutions User Manual for IR FlexCam(R) Pro320, IR FlexCam(R) T320, IR FlexCam(R) Pro and IR FlexCam (R) T Portable Infrared System, pp. 1-1, 2-1, 5-2 and 5-3, copyright 2006 by Infrared Solutions, Inc., Document No. 105127 Rev B, Mar. 2006.
Fluke Users Manual for TiR2, TiR3, TiR4, Ti40, Ti45, Ti50, Ti55 IR FlexCam Thermal Imagers, pp. 1-6, 1-7, 2-2, 2-3, 2-4, 2-5, 8-4, 8-5 and D-9, copyright 2007, 2009 by Fluke Corporation, Jan. 2007, Rev.2, May 2009.
Manual, IR FlexCam(R) User Manual, 60 pages total, pp. 2-3, chapter 1 and pp. 8-9 chapter 2.

* cited by examiner

*Primary Examiner*—Chandrika Prasad
(74) *Attorney, Agent, or Firm*—Fredrikson & Byron, P.A.

(57) ABSTRACT

A thermal imaging device includes a replaceable battery pack, which may include a shock absorbing and/or seal member. A battery portion of the battery pack includes an electrical contact and a sidewall that contains at least one battery cell, which is electrically coupled to the contact. An attachment mechanism of the battery pack is configured to engage a portion of a housing of the device, such that a portion of the battery pack forms a terminal end of the device, the battery portion is held within the portion of the housing, and the electrical contact of the battery portion is operably connected to the imaging assembly of the device. The attachment mechanism is releasable from engagement with the housing, such that an entirety of the battery pack can be completely separated from the thermal imaging device.

18 Claims, 4 Drawing Sheets

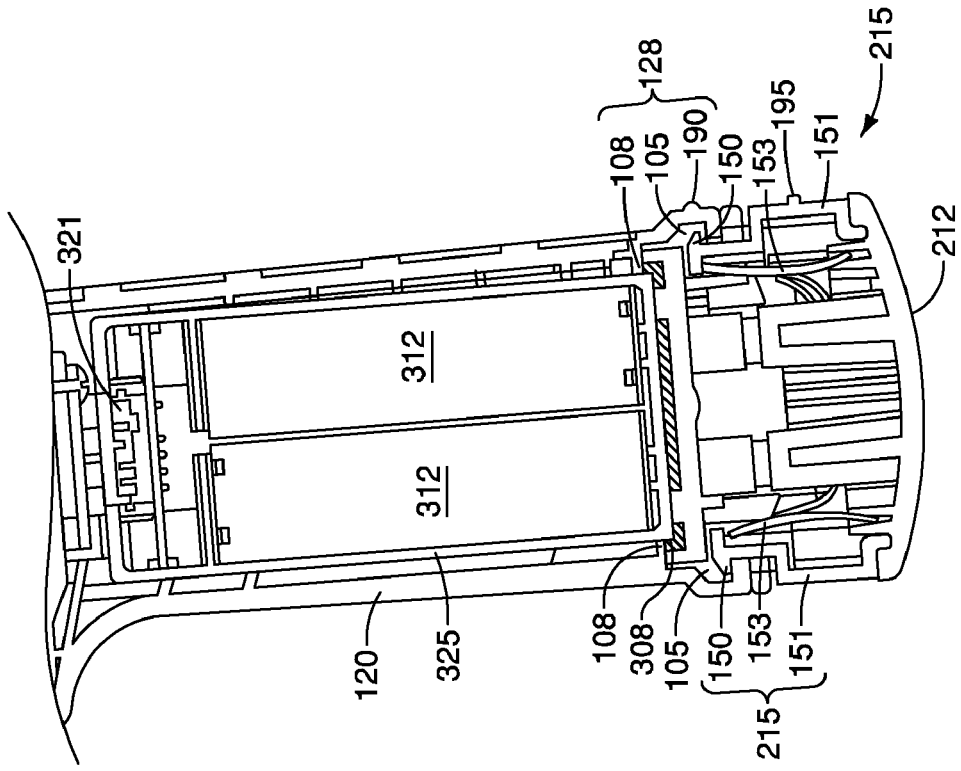
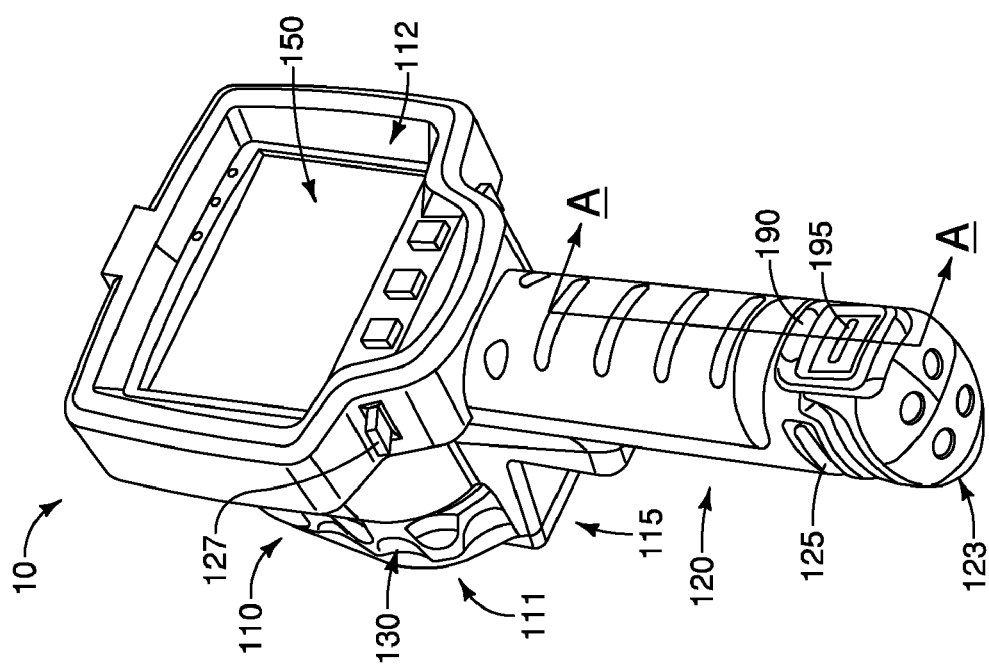
FIGURE 1B
FIGURE 1A

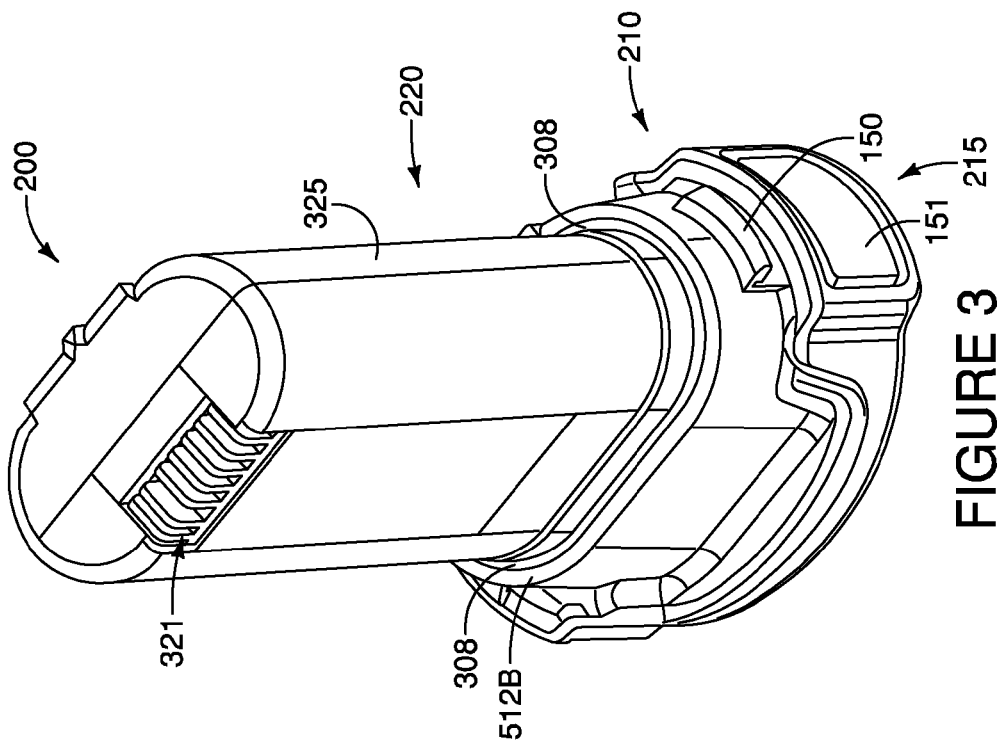
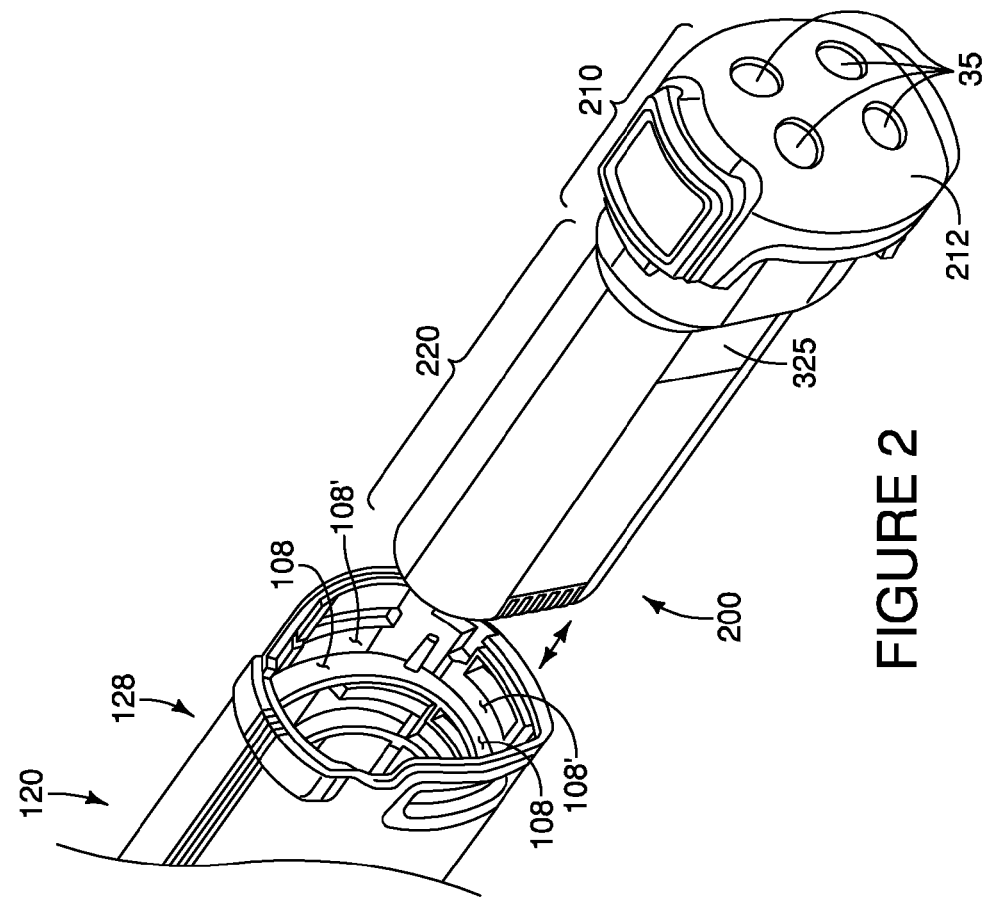

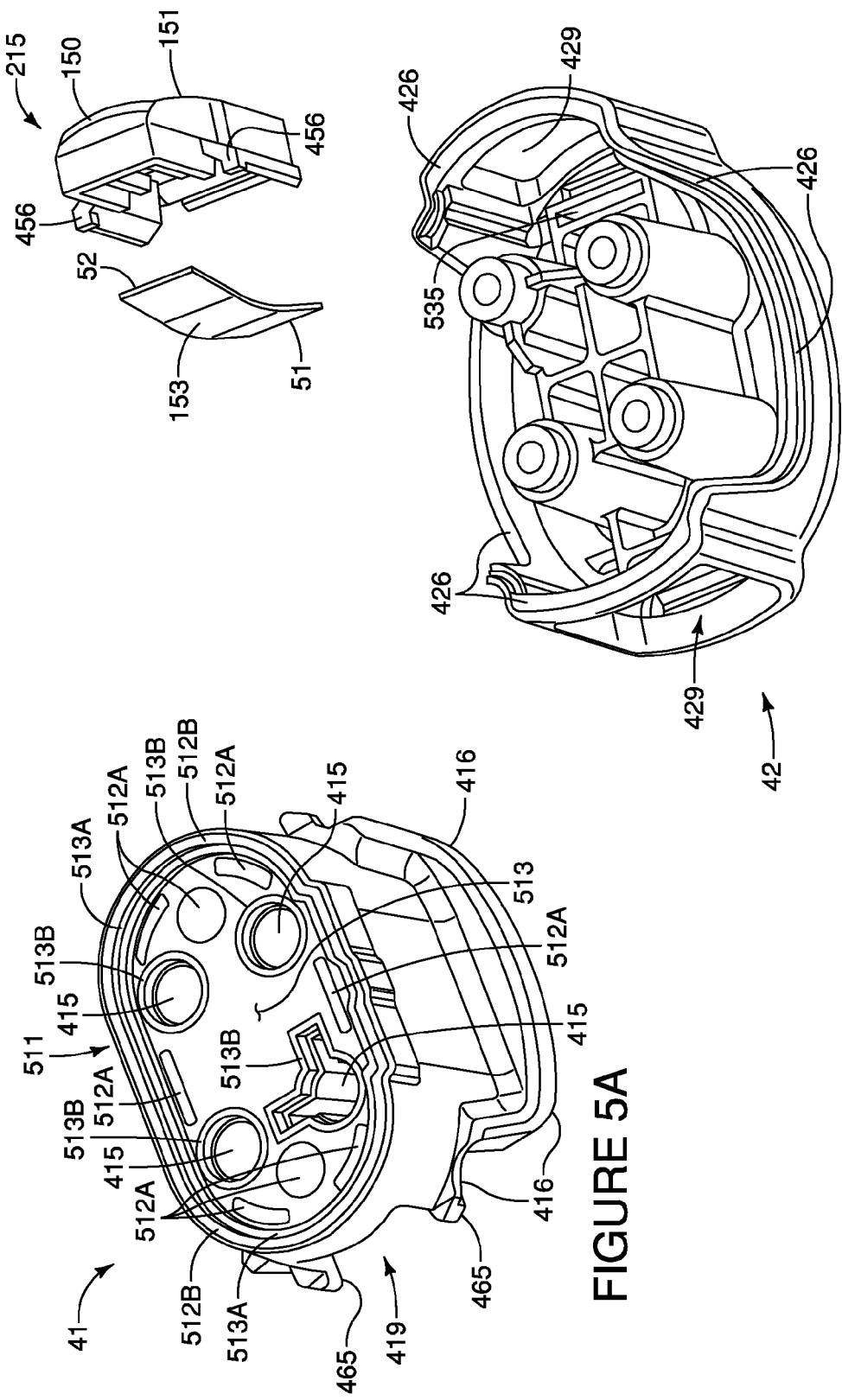

THERMAL IMAGING DEVICE WITH A BATTERY PACK WITH A SHOCK ABSORBER

TECHNICAL FIELD

The present invention pertains to handheld thermal imaging devices and more particularly to these devices that include a replaceable battery pack, and to configurations of replaceable battery packs for these devices.

BACKGROUND

Many state-of-the-art handheld thermal imaging devices, which have a relatively large amount of built-in functionality, are used in a variety of applications, ranging from the inspection of buildings to the inspection and/or evaluation of industrial equipment and processes. The utility of these devices not only relies upon the components, which are necessary to generate and display thermal images, but also upon handling features that facilitate ease of use. Furthermore, there is a need for these devices to withstand the rigors of daily use, which may include exposure to relatively harsh environments and/or the occasional careless handling.

BRIEF DESCRIPTION OF THE DRAWINGS

The following drawings are illustrative of particular embodiments of the invention and therefore do not limit the scope of the invention. The drawings are not to scale (unless so stated) and are intended for use in conjunction with the explanations in the following detailed description. Embodiments of the invention will hereinafter be described in conjunction with the appended drawings, wherein like numerals denote like elements.

FIG. 1A is a perspective view of a thermal imaging device, according to some embodiments of the present invention.

FIG. 1B is a cross-section view through a portion of the thermal imaging device shown in FIG. 1A, according to some embodiments.

FIG. 2 is a perspective view of a replaceable battery pack, having been removed from the portion of the thermal imaging device, according to some embodiments.

FIG. 3 is another perspective view of the battery pack, according to some embodiments.

FIG. 5A is an enlarged perspective view of a part of the base portion, according to some embodiments.

FIG. 5B is an enlarged exploded perspective view of an attachment mechanism and another part of the base portion, according to some embodiments.

DETAILED DESCRIPTION

Figure 4B:
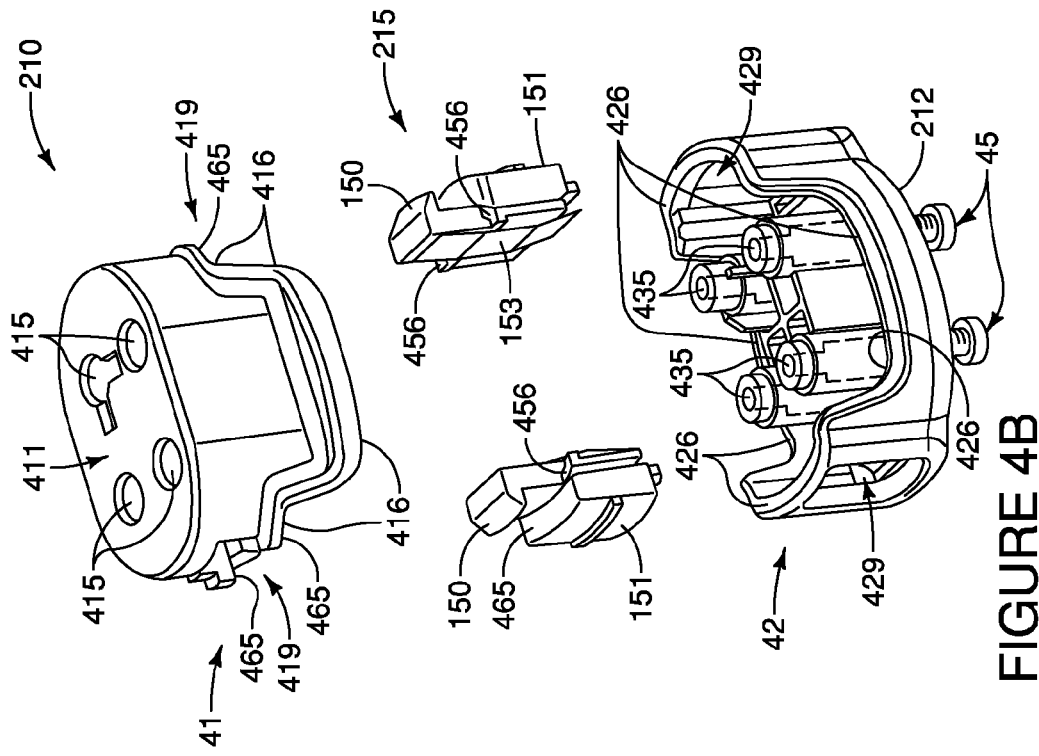
FIG. 4B is an exploded perspective view of a base portion of the battery pack, according to some embodiments.

The following detailed description is exemplary in nature and is not intended to limit the scope, applicability, or configuration of the invention in any way. Rather, the following description provides practical illustrations for implementing exemplary embodiments of the invention.

FIG. 1A is a perspective view of a thermal imaging device 10, according to some embodiments of the present invention. FIG. 1A illustrates a housing of thermal imaging device 10 including a first portion 110 and a second portion 120. The housing may be formed from one or more injection molded, hard plastic parts, which lend structural support to all the components of device 10 that are necessary to capture infrared images, and which provide an effective handling interface for a user of device 10. FIG. 1A further illustrates first portion 110 of the housing including a first side 111, a second side 112, which is opposite first side 111, and a third side 115, from which second portion 120 of the housing extends. According to the illustrated embodiment, second portion 120 of the housing extends toward a terminal end 123 of thermal imaging device 10 and forms a handle for device 10, while first portion 110 of the housing contains a thermal imaging assembly of device 10. The imaging assembly includes those elements, known to those skilled in the art, that are typically necessary for thermal imaging, such as a thermal sensor assembly, for example, a microbolometer thermal detector, a lens assembly and a printed circuit board assembly, for example, including one or more signal processors. A focusing assembly 130 is shown mounted to first side 111 of housing first portion 110, and a display 150 mounted to a second side 112, so that, when a user of device 10 grasps housing second portion 120, as a handle, the user may point focus assembly 130 toward a scene and simultaneously view a captured thermal image of the scene on display 150. An end 128 of housing second portion 120 is shown including an aperture 125 extending therethrough; a handling strap (not shown) may be secured, at one end thereof, to aperture 125, and, at another end thereof, to a loop member 127, which is shown mounted to housing first portion 110. Device 10 further includes various actuation elements and/or buttons, a mounting of which may be ergonomically arranged, for example, as is described in co-pending and commonly-assigned U.S. patent application Ser. No. 11/873,699.

FIG. 1B is a cross-section view, taken along line A-A of FIG. 1A, according to some embodiments. FIG. 1B illustrates a pair of battery cells 312 contained within housing second portion 120 and being electrically connected to the imaging assembly of device 10, via an electrical contact 321. According to embodiments of the present invention, battery cells 312 are included in a replaceable battery pack, for example, battery pack 200, which is shown in FIGS. 2 and 3. FIGS. 1B, 2 and 3 illustrate battery pack 200 including a sidewall 325, which contains battery cells 312, and electrical contact 321, for example, being formed in sidewall 325. With further reference to FIG. 2, battery pack 200 may be divided into two portions: a battery portion 220, which includes sidewall 325, battery cells 312 and electrical contact 321, and a base portion 210, on which battery portion 220 is mounted. When battery pack 200 is inserted into end 128 of housing second portion 120, base portion 210 engages with end 128, for example, as shown in FIG. 1B, such that battery portion 120 is held within an interior of housing second portion 120, the interior of housing second portion 120 is sealed from an environment external thereto, electrical contact 321 is held in electrical connection with a mating connector of the imaging assembly of device 10, and base portion 210 protrudes outside the housing to form terminal end 123 of device 10.

FIG. 3 illustrates base portion 210 including an attachment mechanism 215, which is configured to engage with end 128 of housing second portion 120 and to be releasable therefrom. FIG. 1B illustrates the engagement of attachment mechanism 215, with housing second portion 120, via a pair of opposing projections 150; each projection 150 spring loaded, or biased, by a corresponding spring member 153 of attachment mechanism 215, in order to engage with a corresponding recess 105, which is formed in an inner surface of end 128 of housing second portion 120. FIG. 1B further illustrates attachment mechanism 215 including a pair of opposing release members 151. According to the illustrated embodiment, when release members 151 are pushed toward one another, for example, by a thumb and forefinger of a user, projections 150, which are operatively coupled to release members 151, are moved against the loading/biasing of spring members 153 in order to disengage projections 150 from recesses 105 and, thereby, release attachment mechanism 215 from end 128 of housing second portion 120 so that battery pack 200 may be separated from device 10. Although attachment mechanism 215 is shown including opposing pairs of projections 150, release members 151 and spring members 153, alternate embodiments of the invention may include different configurations of attachment mechanism, for example, which including only a single projection 150, release member 151 and spring member 153. FIGS. 1A-B further illustrate device 10 including orientation markers in the form of two ridges 190, 195; ridge 190 is shown formed on end 128 of housing second portion 120, and ridge 195 on one of release members 151. According to the illustrated embodiment, ridges 190 and 195 serve as both a tactile and a visible reference to help the user to properly orient battery pack 200, when inserting battery pack 200 into housing second portion 120 for engagement with end 128. The proper orientation is necessary in order to align electrical contact 321 of battery pack with the mating connector of the imaging assembly, within the housing, when attachment mechanism 125 engages end 128.

With further reference to FIGS. 2-3, surfaces 108 and 308 of housing end 128 and battery pack 200, respectively, are identified. According to the illustrated embodiment, when attachment mechanism 215 of battery pack 200 engages with end 128, for example, as shown in FIG. 1B, surfaces 108 and 308 come together to form an interface that seals the interior of the housing from an environment external thereto. Surface 308 may be an exposed portion of a seal and/or shock absorbing member, for example, which is formed on base portion 210 of battery pack 200, as will be described in greater detail below. According to some preferred embodiments, surface 108 is relatively hard and non-deformable and is continuous about an entire perimeter of inside of housing end 128, for example, having been formed without any seam, mold parting line, or any other similar discontinuity that could form a leak path at the seal interface. According to some embodiments, in order to keep surface 108 free of these discontinuities, at least end 128, if not a significant portion of housing second portion 120, is molded as a single piece.

With further reference to FIGS. 1A-B, terminal end 123 of device 10, being positioned as shown, may be subject to impact loading, if device 10 is mishandled, for example, dropped; such impact loading could damage the housing of device 10 and/or the components contained within the housing of device 10. Thus, according to some preferred embodiments of the present invention, a shock absorbing member is included in battery pack 200. In some embodiments, an exposed face 212 of base portion 210 of battery pack 200 comprises the shock absorbing member. For example, an entire bulk of a part of base portion 210, that includes face 212 (i.e. part 42 to be described in greater detail, below), is formed from a shock absorbing material; alternately, a layer of shock absorbing material, which includes face 212, is formed over a surface of a part of base portion 210. Preferably a thermoplastic polyester elastomer material (i.e. TPC-ET) is employed to form face 212. Commercially available thermoplastic polyester elastomers include Hytrel®, available from DuPont™, and Riteflex® available from Ticona Engineering Polymers. Alternately, or in addition, a shock absorbing member may be integrated into an internal structure of battery pack 200.

Figure 4A:
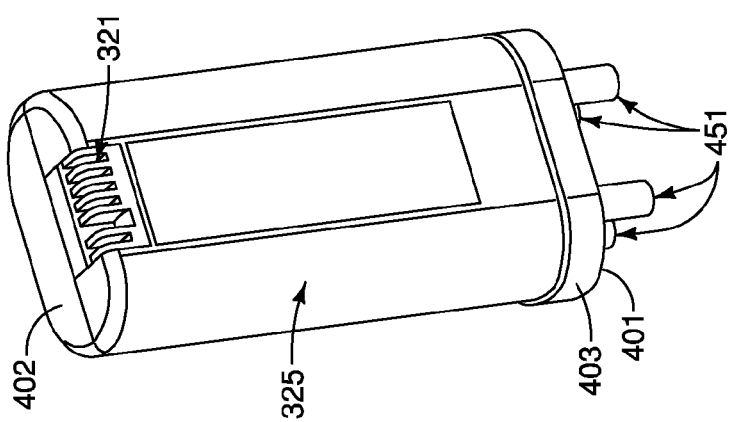
FIG. 4A is a perspective view of a portion of the battery pack, according to some embodiments.

FIG. 4A is a perspective view of battery portion 220 of battery pack 200, according to some embodiments, having been separated from base portion 210; and FIG. 4B is an exploded perspective view of base portion 210, according to some embodiments. FIG. 4A illustrates sidewall 325 of battery portion 220 including opposing first and second outer surfaces 401, 402, and attachment posts 451 that protrude from first outer surface 401. FIG. 4B illustrates base portion 210 including a face 411 configured to interface with first outer surface 401 of battery portion 220, when battery pack 200 is assembled, as shown in FIGS. 2 and 3; receptacles 415 are shown extending from face 411 and into base portion 210, wherein each receptacle 415 is sized and positioned to receive a corresponding attachment post 451 of battery portion 220 for the assembly of battery pack 200. Although not seen in FIG. 4A, one of attachment posts 451 includes a unique profile for mating with only one of receptacles 415, so that a proper orientation of battery portion 220 with respect to base portion 210 is assured in the assembly of battery pack 200.

FIG. 4B further illustrates fasteners 45 (i.e. screws) positioned adjacent to face 212 of base portion 210, where guide bores 35 (FIG. 2) are formed to receive fasteners 45. Openings into guide bores 35 may be seen in FIG. 2, and dashed lines in FIG. 4B show each bore 35 extending within base portion 210, to a corresponding internal opening 435. According to the illustrated embodiment, an end of each fastener 45, when inserted into the corresponding guide bore 35, extends through the corresponding internal opening 435 in order to mate with internal threads of a corresponding post 451, which has been inserted into a corresponding receptacle 415 of base portion 210, when battery pack is assembled 200. O-ring type seals may be employed adjacent to the head of each fastener 45 for sealing against an internal shoulder within the corresponding guide bore 35, when fasteners 45 are tightened. According to some embodiments of the present invention, face 411 of base portion 210 includes a member for shock absorbing and/or sealing, for example, being formed from an elastomer material, such as the thermoplastic elastomer know as Versollan (available from GLS Corporation).

FIG. 5A is an enlarged perspective view of base portion 210, according to some preferred embodiments, wherein a face 511 thereof includes both a seal member and a relatively hard and non-deformable surface. FIG. 5A illustrates the seal member including a central portion 513, an outer perimeter ridge 513A and a plurality of perimeter ridges 513B, each of which surrounds a corresponding receptacle 415. With reference back to FIGS. 3 and 4A, according to the embodiment of FIG. 5A, outer perimeter ridge 513A of the seal member forms surface 308, which surrounds a third outer surface 403 of battery portion sidewall 325, in close proximity to first outer surface 401, when battery pack 200 is assembled, and which seals against surface 108 within end 128 of housing second portion 120 (FIG. 2), when attachment mechanism 215 of battery pack 200 is engaged with end 128. Furthermore, it may be appreciated that each perimeter ridge 513B seals around the corresponding attachment post 451 and against first outer surface 401 of sidewall 325, when fasteners 45 are mated therewith in the assembled battery pack 200.

FIG. 5A further illustrates a plurality of relatively hard and non-deformable surfaces 512A, which are approximately coplanar with central portion 513 of the seal member, and an outer relatively hard and non-deformable surface 512B, that surrounds outer perimeter ridge 513A of the seal member. According to the illustrated embodiment, surfaces 512A form a relatively hard and non-deformable interface between base portion 210 and first outer surface 401 of battery portion 220, which, by providing a 'hard stop', limits a compression of the seal member when battery portion 220 is secured to base portion 210, for example, via the tightening of fasteners 45 within posts 451. This 'hard stop' can prevent an over-tightening of fasteners 45, that could overload and potentially damage posts 451, and can further control a tolerance of the assembly of battery pack 200, for example, with respect to the location of electrical contact 321 relative to attachment mechanism 215, so that both contact 321 and attachment mechanism 215 operatively couple with device 10, when a user inserts battery pack into housing second portion 120, as previously described. With reference back to FIG. 1B, outer surface 512B may abut surface 108 to also provide a 'hard stop', at the interface between battery pack 200 and housing end 128, when attachment mechanism 125 engages with end 128.

According to some preferred embodiments, the seal member of face 511 is formed over a portion of a surface of a part 41 of base portion 210, preferably by a two-shot molding process or by an over-molding process, so as to leave other portions of the surface exposed as the aforementioned relatively hard and non-deformable surfaces 512A, 512B. Part 41 may be formed from a relatively hard plastic, such as a polycarbonate-acrylonitrile butadiene styrene blend (PC-ABS), for example, available from Sabic Innovative Plastics, and the seal member from an elastomer, such as the aforementioned thermoplastic elastomer. According to alternate embodiments, the seal member may be separately formed as a piece part, which is subsequently coupled in between the surface of part 41 and first outer surface 401 of battery portion sidewall 325.

Returning now to FIG. 4B, base portion 210 is shown including both first part 41 and a second part 42, which, when brought together, for example, as illustrated in FIG. 3, hold attachment mechanism 215 in place. FIG. 4B illustrates a sidewall of each of parts 41 and 42 having opposing openings 419, 429 and an edge 416 and 426, respectively; the contours of edges 416, 426 mate with one another to align opposing openings 419 of first part 41 with opposing openings 429 of second part 42. Second part 42, like first part 41, may be formed from a relatively hard plastic, such as PC-ABS or, according to some preferred embodiments, may be formed from a thermoplastic polyester elastomer, such as the aforementioned Hytrel® or Riteflex®, in order to function as a shock absorbing member, as previously described. If second part 42 is formed from the relatively hard plastic, a layer of shock absorbing material may extend over a surface of part 42 to form exposed face 212.

With reference to FIG. 3, in conjunction with FIG. 4B, it can be appreciated that each of opposing openings 419 of first part 41 surround a corresponding projection 150 of attachment mechanism 215, and that each of opposing openings 429 of second part 42 surround a corresponding release member 151 of attachment mechanism 215. According to the illustrated embodiment, each projection 150 and the corresponding release member 151 are integrally formed, for example, from a hard plastic material such as an acetal copolymer, for example, Celcon M90 (available from Ticona Engineering Polymers), which may be selected for its relatively lubricious surface properties. Fasteners 45, in addition to securing battery portion 220 to base portion 210, secure attachment mechanism 215 in place, by securing first and second parts 41, 42 together around attachment mechanism 215.

With reference to FIG. 5B, which is an enlarged exploded perspective view of attachment mechanism 215 and second part 42, spring member 153 is shown formed as a leaf spring and a slot 535 is shown formed within second part 42 to receive a first end 51 of spring member 153, such that, when a second end 52 of spring member 153 is coupled with projection 150, and, when release member 151 is placed within opening 429 of second part 42, spring member 153 may be compressed between projection 150 and second part 42, for example, as is shown in the cross-section of FIG. 1B. Spring member 153 may be formed from stainless steel, for example, 301 stainless, having a thickness of approximately 0.4 mm.

FIGS. 4B and 5A-B further illustrate each release member 151 including shoulders 456, which extend from either side of the corresponding projection 150, and portions 465 of edge 416 of first part 41, that are configured to abut shoulders 456, when battery pack 200 is assembled, according to some embodiments, so as to hold each projection 150 in a predetermined position. The predetermined position ensures that projections 150 are located at an appropriate distance from face 411/511 of base portion 210 so that, when projections 150 are received by recesses 105 of the housing of thermal imaging device 10 (FIG. 1B), electrical contact 321 of battery portion 220 is operatively connected with the imaging assembly of device 10, and the seal member of face 411/511 is sufficiently compressed against surface 108 within end 128 of housing second portion 120, in order to seal the interior of the housing from an environment external thereto. The predetermined position, in conjunction with the compression properties of the seal interface, also allows projections 150 to move past a lip of recesses 105, as battery pack 200 is being inserted into end 128 of housing second portion 120, and then to 'snap' into engagement with recesses 105.

In the foregoing detailed description, the invention has been described with reference to specific embodiments. However, it may be appreciated that various modifications and changes can be made without departing from the scope of the invention as set forth in the appended claims. For example, end 128 of housing second portion 120 may include a seal member located to interface with a relatively hard and non-deformable surface of replaceable battery pack 200, when attachment mechanism 215 engages end 128. Such a seal member may be employed in conjunction with, or as an alternative to, surface 308 or perimeter ridge 513A of the above-described battery pack seal member, although it is preferred that replaceable battery pack 200 include a seal member, in order to introduce a new seal member each time the battery pack is replaced. Furthermore, one or more radially projecting seal members, either in addition to, or as an alternative to the axial projecting surface 308/perimeter ridge 513A and/or ridges 513B, may be employed by alternate embodiments of the present invention. For example, with reference to FIGS. 2 and 4A, a seal member may project radially from third outer surface 403 of battery portion sidewall 325 to seal against a relatively hard and non-deformable inner surface 108' of housing end 128, when attachment mechanism 215 engages end 128 and surface 512B is in proximity to surface 108. Likewise a radial seal member may be formed around each attachment post 451 or within each receptacle 415.

We claim:
1. A thermal imaging device comprising:
   a housing containing an imaging assembly of the device; and
   a replaceable battery pack including a sidewall, a shock absorbing member, an attachment mechanism and an electrical contact, the sidewall containing at least one battery cell being coupled to the electrical contact, and the attachment mechanism being configured to engage with an end of the housing and to be releasable therefrom;

wherein, when the attachment mechanism of the battery pack engages with the end of the housing, the electrical contact of the battery portion is held in electrical connection with the imaging assembly, within the housing, and a portion of the battery pack forms a terminal end of the device, outside the housing;

the shock absorbing member of the replaceable battery pack comprises a layer of material formed over the portion of the battery pack that forms the terminal end of the device; and when the attachment mechanism is released from engagement with the end of the housing, an entirety of the replaceable battery pack is completely separable from the device.

2. The thermal imaging device of claim 1, wherein the replaceable battery pack further includes a seal member for sealing an interior of the housing from an environment external thereto, when the attachment mechanism of the battery pack engages with the end of the housing.

3. The thermal imaging device of claim 2, wherein:

the seal member of the replaceable battery pack includes an outer perimeter ridge, the outer perimeter ridge surrounding the sidewall of the battery pack; and the end of the housing includes a relatively hard and non-deformable surface against which the outer perimeter ridge of the seal member abuts, when the attachment mechanism of the battery pack engages with the end of the housing.

4. The thermal imaging device of claim 3, wherein the battery pack further comprises a relatively hard and non-deformable surface, which is located to also abut the relatively hard and non-deformable surface of the end of the housing, when the attachment mechanism of the battery pack engages with the end of the housing.

5. The thermal imaging device of claim 2, wherein the seal member is formed by either a two shot molding process or an over-molding process.

6. The thermal imaging device of claim 1, wherein:

the end of the housing includes a recess formed in an inner surface thereof;

the attachment mechanism of the replaceable battery pack comprises a projection and a release member, the projection being spring-loaded and the release member being coupled to the projection;

the projection is configured to be received by the recess of the housing, for engagement therewith; and the release member is located such that a finger of a hand can push against the release member in order to move the projection against the spring loading, thereby disengaging the projection from the recess of the housing in order to release the attachment mechanism from engagement with the end of the housing.

7. The thermal imaging device of claim 6, wherein:

the attachment mechanism of the replaceable battery pack further includes a leaf spring member to create the spring loading for the projection of the attachment mechanism; and the leaf spring member includes a first end and a second end, the first end being mounted in a slot formed in an inner surface of the base portion, and the second end being coupled to the projection.

8. The thermal imaging device of claim 1, wherein:

the housing includes a first portion and a second portion, the first portion of the housing containing the imaging assembly and including a first side, to which a focusing assembly of the device is mounted, a second side, which is opposite the first side and to which a display of the device is mounted, and a third side, which extends between the first and second sides;

the second portion of the housing extends out from the third side of the first portion of the housing, to form a handle of the device, and includes the end of the housing with which the attachment mechanism of the replaceable battery pack engages.

9. The thermal imaging device of claim 1, wherein the end of the housing and the attachment mechanism of the replaceable battery pack each include an orientation marker to facilitate a proper orientation of the battery pack for engagement with the end of the housing.

10. The thermal imaging device of claim 1, wherein the layer of material comprises a thermoplastic polyester elastomer.

11. The thermal imaging device of claim 1, wherein the shock absorbing member also serves for sealing an interior of the housing from an environment external thereto, when the attachment mechanism of the battery pack engages with the end of the housing.

12. A battery pack for a thermal imaging device, the battery pack comprising:

a battery portion including a sidewall, which contains at least one battery cell, and an electrical contact for connecting the at least one battery cell to an imaging assembly of the thermal imaging device; and a base portion including a first face, against which the battery portion is secured, a second face, opposite the first face, a shock absorbing member comprising a layer of material formed over the base portion, and an attachment mechanism, which is configured to engage with a housing of the device and to be releasable therefrom;

wherein, when the attachment mechanism engages with the housing of the thermal imaging device, the battery portion is held within the housing, the electrical contact of the battery portion is held in electrical connection with the imaging assembly of the device, within the housing, and the base portion forms a terminal end of the thermal imaging device, that protrudes outside the housing; and when the attachment mechanism is released from engagement with the housing of the device, an entirety of the battery pack is completely separable from the thermal imaging device.

13. The battery pack of claim 12, wherein the shock absorbing member also serves for sealing an interior of the housing of the thermal imaging device from an environment external thereto, when the attachment mechanism engages with the housing.

14. The battery pack of claim 12, wherein the second face of the base portion of the replaceable battery pack comprises the shock-absorbing member.

15. The battery pack of claim 12, wherein the layer of material comprises a thermoplastic polyester elastomer.

16. The battery pack of claim 12, wherein:

the attachment mechanism of the base portion comprises a projection and a release member, the projection being spring-loaded and the release member being coupled to the projection;

the projection is configured to be received by a recess of the housing of the thermal imaging device for engagement therewith; and the release member is located between the first and second faces of the base portion such that a finger of a hand can push against the release member in order to move the projection against the spring loading, thereby disengaging the projection from the recess of the housing of the thermal imaging device, in order to release the attachment mechanism from engagement therewith.

17. The battery pack of claim 16, wherein:

the attachment mechanism of the base portion further includes a leaf spring member to create the spring loading for the projection of the attachment mechanism; and the leaf spring member includes a first end and a second end, the first end being mounted in a slot formed in an inner surface of the base portion, and the second end being coupled to the projection.

18. The battery pack of claim 12, wherein:

the attachment mechanism of the base portion of the replaceable battery pack comprises opposing projections and opposing release members, each projection being spring-loaded and each release member being coupled to a corresponding projection;

each projection is configured to be received by a corresponding recess of opposing recesses of the housing of the thermal imaging device, for engagement therewith; and the release members are located in between the first and second faces of the base portion, being spaced apart from one another such that a thumb and a forefinger of a hand can push the third and fourth faces toward one another in order to move the opposing projections against the spring loading, thereby disengaging each projection from the corresponding recess of the housing of the thermal imaging device, in order to release the attachment mechanism from engagement therewith.

* * * * *